US012672648B1

(12) United States Patent
Brown

(10) Patent No.: US 12,672,648 B1
(45) Date of Patent: Jul. 7, 2026

(54) SYSTEM FOR DETERRING PREDATION OF DOMESTICATED ANIMALS

(71) Applicant: Victor T. Brown, Millbrook, AL (US)

(72) Inventor: Victor T. Brown, Millbrook, AL (US)

( * ) Notice: Subject to any disclaimer, the term of this patent is extended or adjusted under 35 U.S.C. 154(b) by 176 days.

(21) Appl. No.: 18/643,655

(22) Filed: Apr. 23, 2024

(51) Int. Cl.
| | |
|---|---|
| *A01M 29/32* | (2011.01) |
| *A01K 1/00* | (2006.01) |
| *A01M 29/00* | (2011.01) |
| *A01M 29/06* | (2011.01) |
| *A01M 31/06* | (2006.01) |

(52) U.S. Cl.
CPC ........... *A01M 29/32* (2013.01); *A01K 1/0041* (2013.01); *A01M 29/00* (2013.01); *A01M 29/06* (2013.01); *A01M 31/06* (2013.01)

(58) Field of Classification Search
CPC ....... E04H 15/28; A01M 29/32; A01M 29/06; A01M 29/00; A01M 31/06; Y10S 119/903; A01K 31/12; A01K 37/00; A01K 1/00
See application file for complete search history.

(56) References Cited

U.S. PATENT DOCUMENTS

| | | | | | |
|---|---|---|---|---|---|
| 1,906,016 | A | * | 4/1933 | Stecher | A01K 39/00 |
| | | | | | 119/900 |
| 5,410,982 | A | | 5/1995 | Mann | |
| 5,476,062 | A | | 12/1995 | Ondris | |
| 5,986,551 | A | * | 11/1999 | Pueyo | A01M 31/002 |
| | | | | | 119/713 |
| 6,082,285 | A | | 7/2000 | Hinrichs | |
| 6,385,895 | B1 | * | 5/2002 | Scaries | A01M 31/06 |
| | | | | | 43/2 |
| 6,532,701 | B2 | * | 3/2003 | Williams | A01K 1/0041 |
| | | | | | 52/646 |
| 6,640,506 | B2 | * | 11/2003 | Landers | A01M 29/06 |
| | | | | | 43/1 |
| 8,434,274 | B2 | | 5/2013 | Anderson, Jr. | |
| 10,321,673 | B1 | | 6/2019 | Bagley | |
| 11,129,377 | B1 | * | 9/2021 | Williams | A01M 29/32 |
| 2006/0283370 | A1 | | 12/2006 | Kurtzweil | |
| 2012/0174498 | A1 | * | 7/2012 | Anderson, Jr. | H01Q 1/1242 |
| | | | | | 52/741.3 |
| 2014/0184463 | A1 | * | 7/2014 | Hicks | H01Q 21/24 |
| | | | | | 343/797 |

FOREIGN PATENT DOCUMENTS

AU            626864            8/1992

* cited by examiner

*Primary Examiner* — Omar F Hijaz
(74) *Attorney, Agent, or Firm* — Kyle A. Fletcher, Esq.

(57)            ABSTRACT

The system for deterring predation of domesticated animals is a protective structure. The system for deterring predation of domesticated animals is adapted for use with livestock. The system for deterring predation of domesticated animals forms a protected space that prevents birds of prey from attacking the livestock. The system for deterring predation of domesticated animals incorporates an elevating structure, a disk structure, and a plurality of monofilament cords. The elevating structure elevates the disk structure above the ground. The plurality of monofilament cords are suspended above the ground by the disk structure. The plurality of monofilament cords forms a barrier structure that encloses the protected space. The barrier structure prevents birds of prey from entering the protected space.

10 Claims, 5 Drawing Sheets

SYSTEM FOR DETERRING PREDATION OF DOMESTICATED ANIMALS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of a repelling barrier specially adapted for birds. (A01M29/32)

SUMMARY OF INVENTION

The system for deterring predation of domesticated animals is a protective structure. The system for deterring predation of domesticated animals is adapted for use with livestock. The system for deterring predation of domesticated animals forms a protected space that prevents birds of prey from attacking the livestock. The system for deterring predation of domesticated animals comprises an elevating structure, a disk structure, and a plurality of monofilament cords. The elevating structure elevates the disk structure above the ground. The plurality of monofilament cords are suspended above the ground by the disk structure. The plurality of monofilament cords forms a barrier structure that encloses the protected space. The barrier structure prevents birds of prey from entering the protected space.

These together with additional objects, features and advantages of the system for deterring predation of domesticated animals will be readily apparent to those of ordinary skill in the art upon reading the following detailed description of the presently preferred, but nonetheless illustrative, embodiments when taken in conjunction with the accompanying drawings.

In this respect, before explaining the current embodiments of the system for deterring predation of domesticated animals in detail, it is to be understood that the system for deterring predation of domesticated animals is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the system for deterring predation of domesticated animals.

It is therefore important that the claims be regarded as including such equivalent construction insofar as they do not depart from the spirit and scope of the system for deterring predation of domesticated animals. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
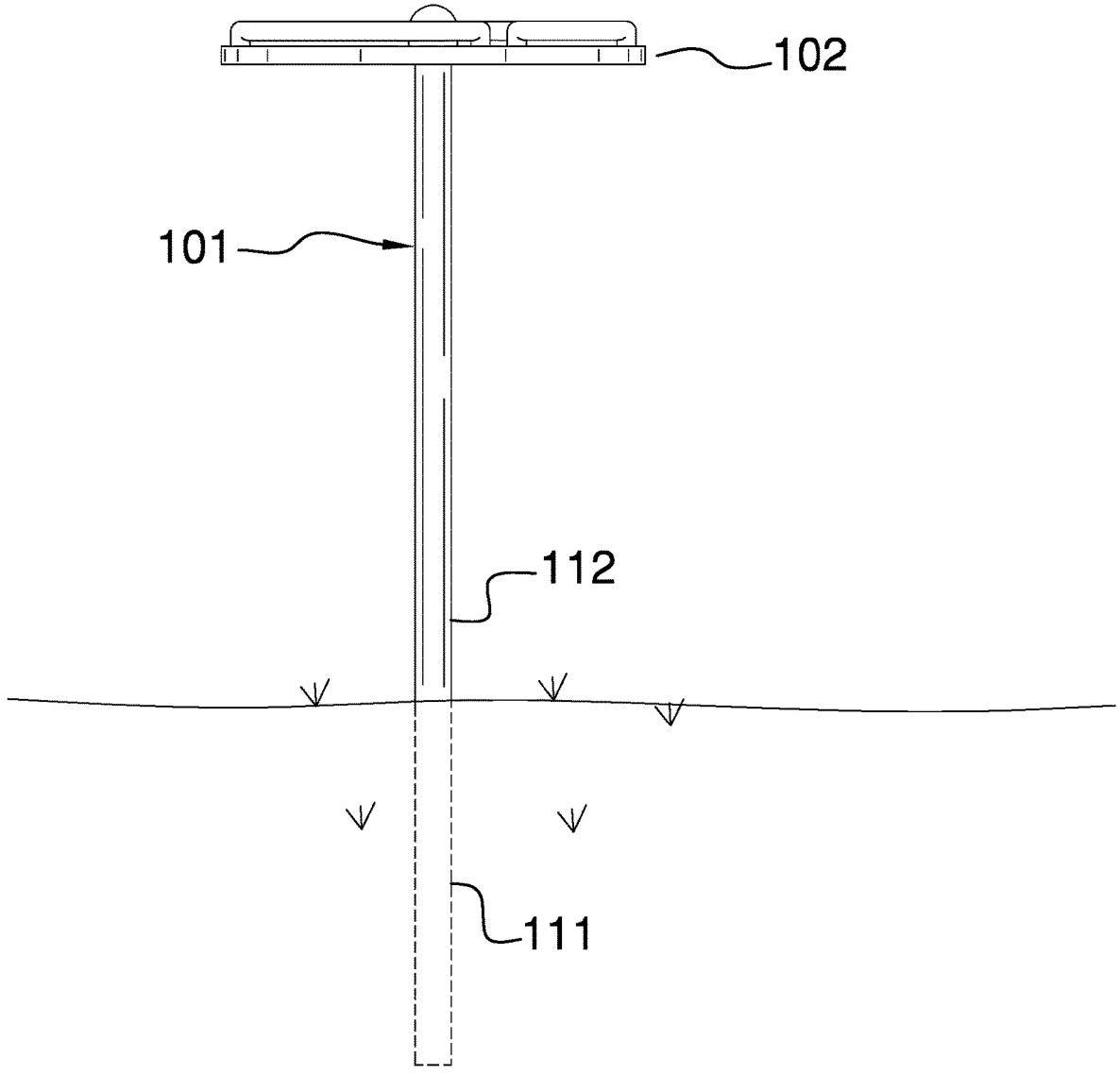
FIG. 1 is a front view of an embodiment of the disclosure.
Figure 2:
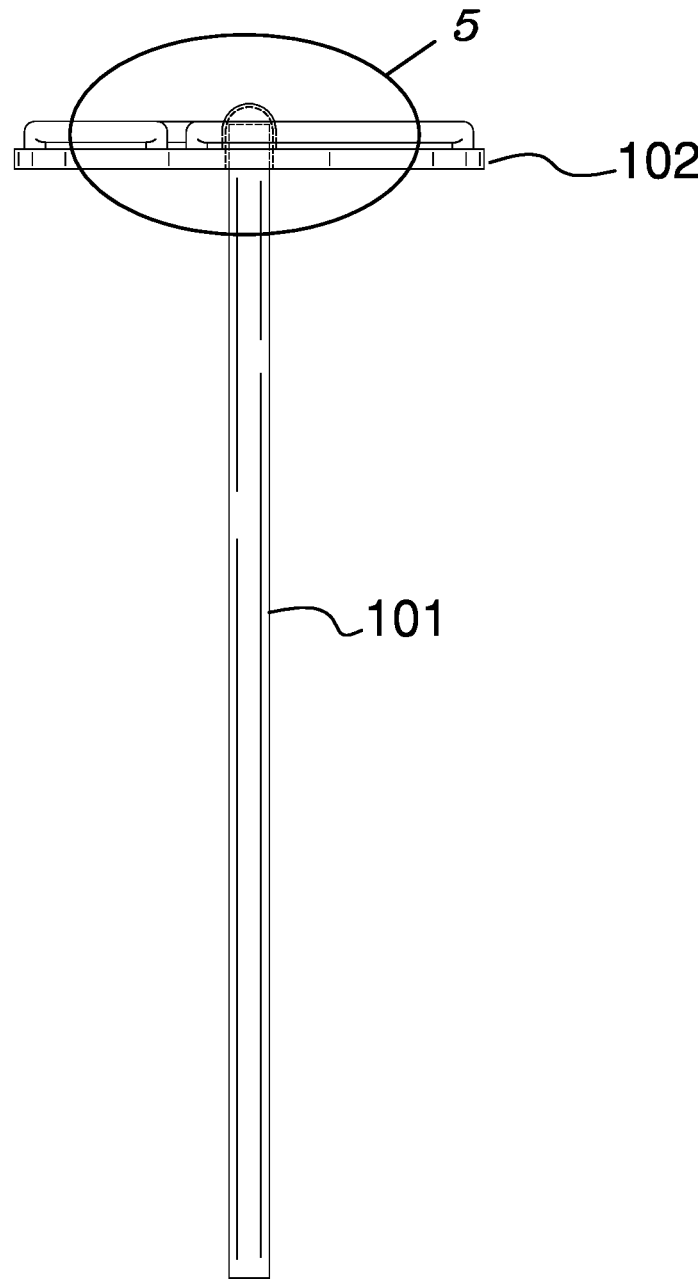
FIG. 2 is a side view of an embodiment of the disclosure.
Figure 3:
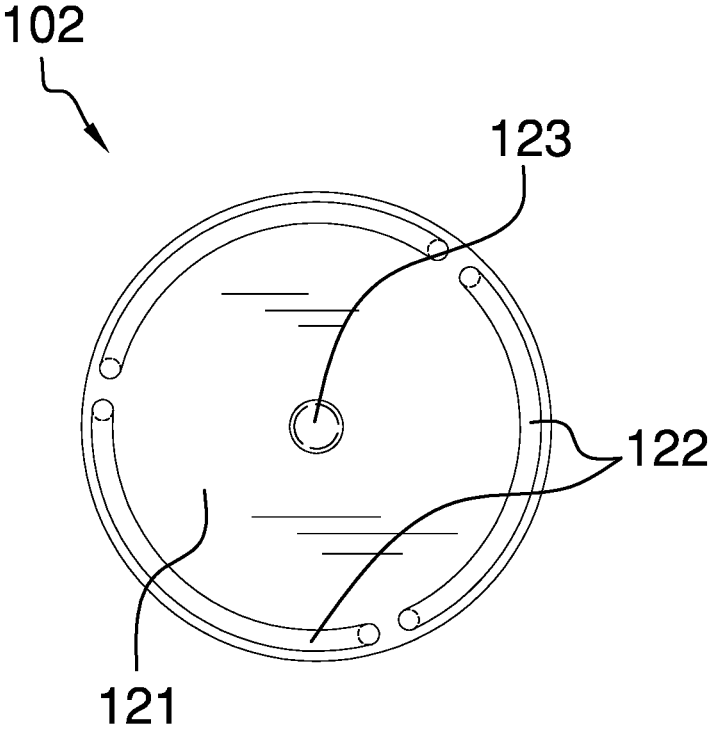
FIG. 3 is a top view of an embodiment of the disclosure.
Figure 4:
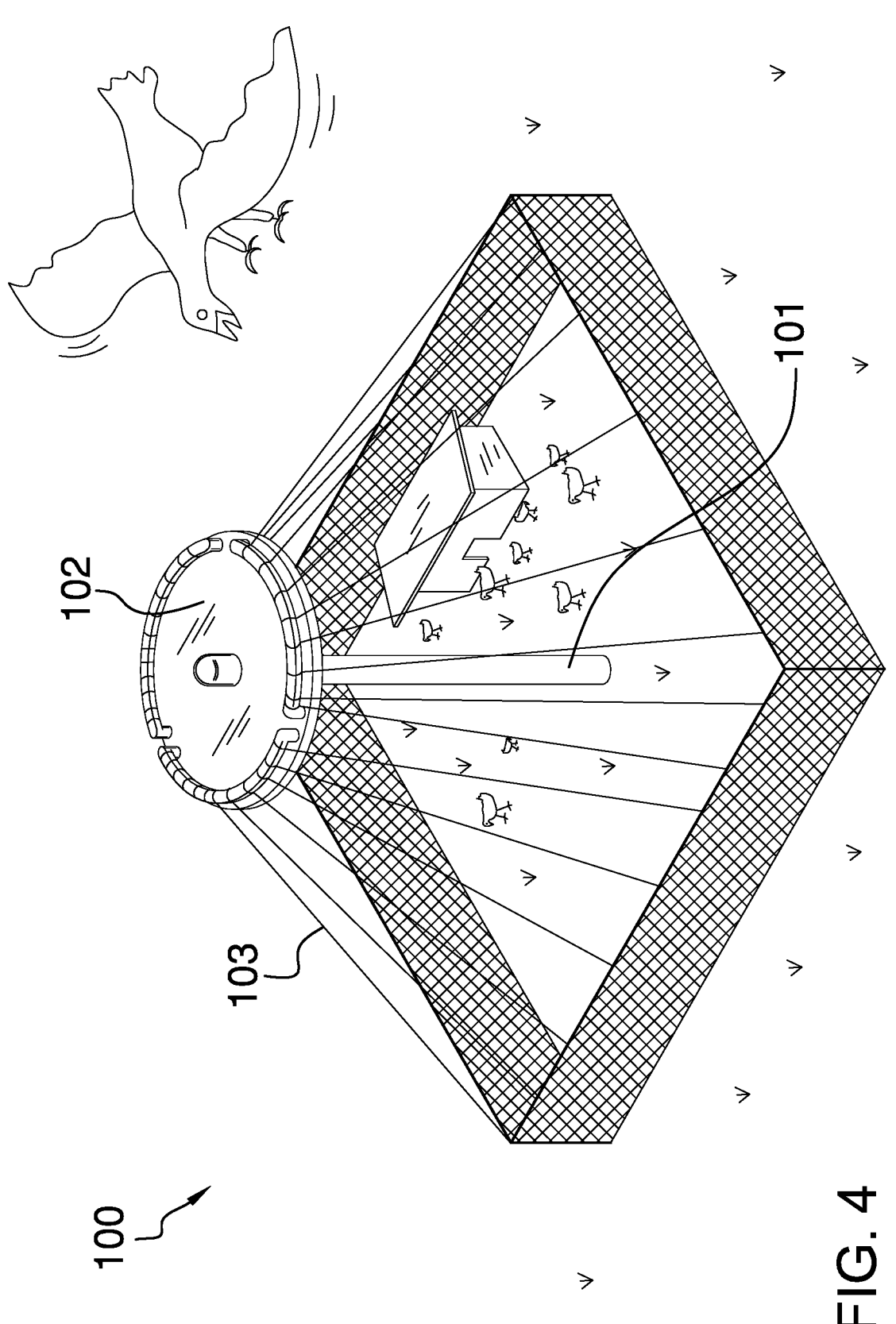
FIG. 4 is an in-use view of an embodiment of the disclosure.
Figure 5:
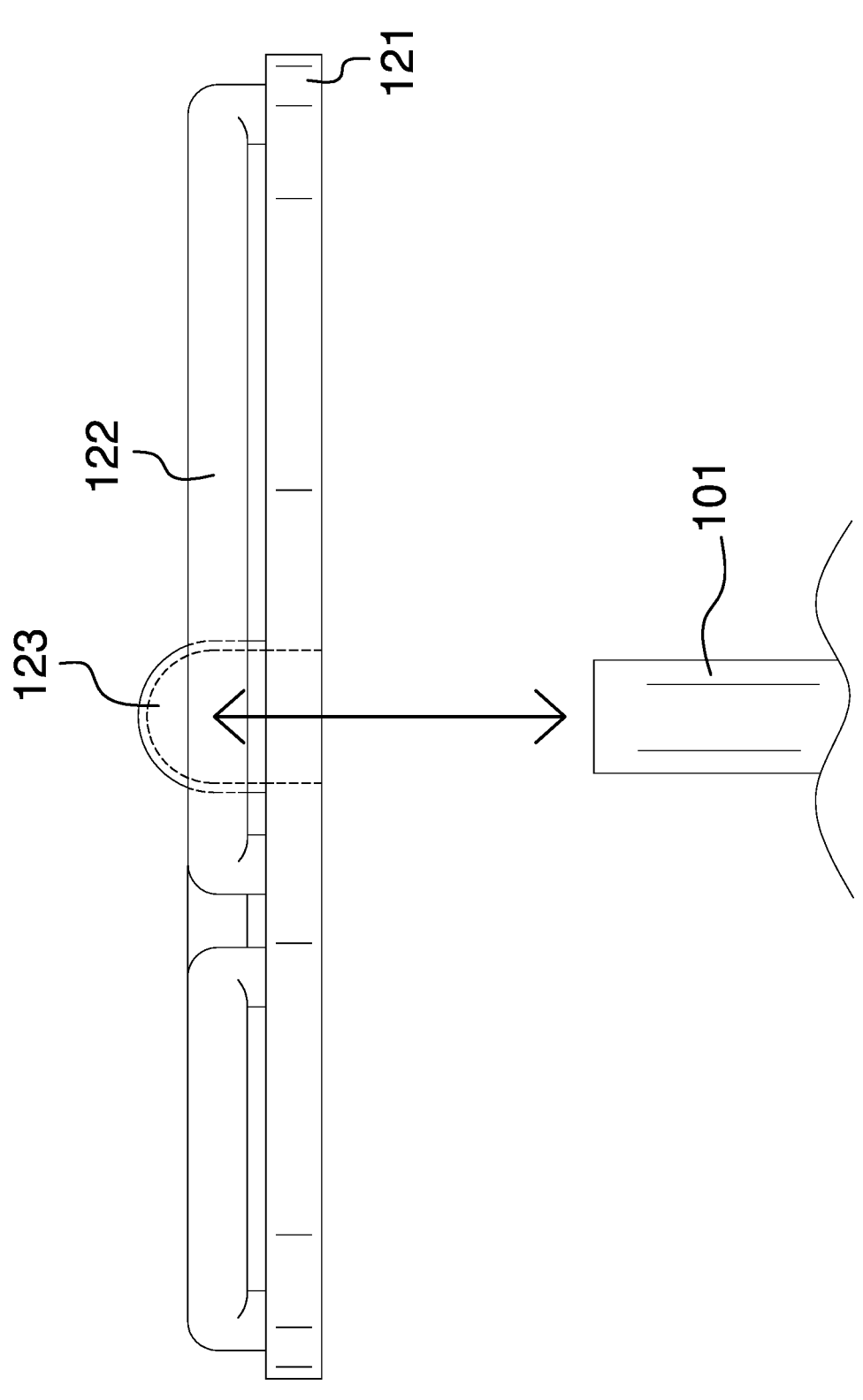
FIG. 5 is an exploded view of an embodiment of the disclosure.

Detailed reference will now be made to one or more potential embodiments of the disclosure, which are illustrated in FIGS. 1 through 5.

The system for deterring predation of domesticated animals 100 (hereinafter invention) is a protective structure. The invention 100 is adapted for use with livestock. The invention 100 forms a protected space that prevents birds of prey from attacking the livestock. The invention 100 comprises an elevating structure 101, a disk structure 102, and a plurality of monofilament cords 103. The elevating structure 101 elevates the disk structure 102 above the ground. The plurality of monofilament cords 103 are suspended above the ground by the disk structure 102. The plurality of monofilament cords 103 forms a barrier structure that encloses the protected space. The barrier structure prevents birds of prey from entering the protected space.

The elevating structure 101 is a prism shaped structure. The elevating structure 101 is a load bearing structure. The elevating structure 101 is an extension structure. The elevating structure 101 elevates the disk structure 102 above the ground. The disk structure 102 attaches to the elevating structure 101 to form a composite prism structure. The elevating structure 101 forms a stanchion structure that is anchored into the ground. The center axis of the elevating structure 101 is roughly vertically oriented. The elevating structure 101 transfers the load of the disk structure 102 to the ground. The elevating structure 101 comprises a stake substructure 111 and a stanchion substructure 112.

The stake substructure 111 forms the inferior structure of the elevating structure 101. The stake substructure 111 anchors the invention 100 into the ground. The stake substructure 111 is driven into the ground. The stake substructure 111 is the portion of the prism structure of the elevating structure 101 that is below the surface of the ground.

The stanchion substructure 112 is the portion of the prism structure of the elevating structure 101 that is above the ground. The stanchion substructure 112 projects away from the ground in a roughly vertical direction. The disk structure 102 attaches to the congruent end of the stanchion substructure 112 that is distal from the ground. The stanchion substructure 112 forms the extension structure that elevates the disk structure 102 above the ground.

The disk structure 102 is a disk shaped structure. The disk structure 102 is a rigid structure. The disk structure 102 is a load bearing structure. The plurality of monofilament cords 103 attach to the disk structure 102. The disk structure 102 elevates the plurality of monofilament cords 103 above the ground. The disk structure 102 forms the superior structure of the invention 100. The disk structure 102 attaches to the superior congruent end of the elevating structure 101 to form a composite prism structure. The disk structure 102 comprises a plate structure 121, a plurality of anchor bars 122, and a fastening cap 123.

The plate structure 121 forms the primary structure of the disk structure 102. The plate structure 121 has a disk shape. The plate structure 121 is a rigid structure. The plate structure 121 forms the primary shape of the disk structure 102. The plate structure 121 attaches to the superior congruent end of the elevating structure 101. The plate structure 121 attaches to the elevating structure 101 to form a composite prism structure. The plurality of anchor bars 122 attach to the plate structure 121. The fastening cap 123 attaches to the plate structure 121.

Each anchor bar selected from the plurality of anchor bars 122 permanently attaches to a congruent end of the disk structure of the plate structure 121. Each selected anchor bar forms an anchor point that the initial end of each monofilament cord selected from the plurality of monofilament cords 103 attaches to. Each selected anchor bar forms a plurality of anchor points for a subplurality of monofilament cords selected from the plurality of monofilament cords 103.

The fastening cap 123 is a fastening device. The fastening cap 123 removably attaches the plate structure 121 to the superior congruent end of the elevating structure 101.

Each monofilament cord selected from the plurality of monofilament cords 103 is a cord. Each selected monofilament cord has a monofilament constructure. An initial end of each selected monofilament cord is fixed to the disk structure 102. The remaining end of each selected monofilament cord attaches to an anchor structure that is proximal to the ground.

The plurality of monofilament cords 103 form the barrier structure of the protected space formed by the invention 100. Each monofilament cord selected from the plurality of monofilament cords 103 is laid out such that the plurality of monofilament cords 103 are evenly distributed around the 360 degree arc formed by the disk structure 102. The plurality of monofilament cords 103 combine to form a barrier that catches on the wing of any bird of prey that attempts to pass through the barrier structure formed by the plurality of monofilament cords 103.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Barrier: As used in this disclosure, a barrier is a physical obstacle that forms a boundary between a first space and a second space. The barrier prevents the passage of an object between the first space and the second space.

Bridge: As used in this disclosure, a bridge refers to a load bearing structure that attaches a first object and to a second object such that a load bearing path is formed between the first object and the second object. The verb "to bridge" means to establish a connection (or remove a disconnection) between a first object and a second object.

Cant: As used in this disclosure, a cant is an angular deviation from one or more reference lines (or planes) such as a vertical line (or plane) or a horizontal line (or plane).

Capped Tube: As used in this disclosure, a capped tube is a tube with one closed end and one open end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Cord: As used in this disclosure, a cord is a long, thin, flexible, and prism shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, yarn, and rope are synonyms for cord. This definition further includes textile webbings as a type of cord.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Extension Structure: As used in this disclosure, an extension structure is an inert physical structure that is used to extend or bridge the reach between any two objects.

Exterior: As used in this disclosure, the exterior is used as a relational term that implies that an object is not contained within the boundary of a structure or a space.

Fastening Device: As used in this disclosure, a fastening device is a device that is used to join or affix a first object to a second object.

Filament: As used in this disclosure, a filament is a thread like fiber or object that is used in the production of a yarn. A synthetic filament refers to a filament formed from synthetic fibers.

Fitted: As used in this disclosure, the term fitted refers to two geometrically similar structures wherein the smaller geometrically similar structure inserts into the larger geometrically similar structure.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Friction: As used in this disclosure, friction refers to a force that occurs between two objects that are in relative motion while in contact with each other. The force resists the relative motion of the two objects. More technically, friction refers to an exchange of energy between two objects that are in contact with each other that converts the energy of a directed relative motion between the two objects into randomly directed motions of the molecules that form both objects.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Ground: As used in this disclosure, the ground is a solid supporting surface formed by the Earth. The term level ground means that the supporting surface formed by the ground is roughly perpendicular to the force of gravity. The term underground refers to an object being underneath the superior surface of the ground.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Knot: As used in this disclosure, a knot is an interlacement of cord, ribbon, rope, or similar materials that is used to: 1) secure the cord, ribbon, rope, or other similar material to an object which may include, but is not limited to, a second cord, ribbon, rope, or other similar material; or, 2) prevent the cord, ribbon, rope, or other similar material from being pulled through a hole or out of a retaining device. In this disclosure, the second type of knot is referred to as a stop knot.

Livestock: As used in this disclosure, livestock refers to one or more animals that are maintained as the property of an agricultural operation.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Monofilament: As used in this disclosure, a monofilament refers to a yarn or a cord that is formed from a single continuous filament.

Negative Space: As used in this disclosure, negative space is a method of defining an object through the use of open or empty space as the definition of the object itself, or, through the use of open or empty space to describe the boundaries of an object.

Load Path: As used in this disclosure, a load path refers to a chain of one or more structures that transfers a load generated by a raised structure or object to a foundation, supporting surface, or the earth.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Reach: As used in this disclosure, reach refers to a span of distance between any two objects.

Rigid Structure: As used in this disclosure, a rigid structure is a solid structure formed from an inelastic material that resists changes in shape. A rigid structure will permanently deform as it fails under a force. See bimodal flexible structure.

Roughly: As used in this disclosure, roughly refers to a comparison between two objects. Roughly means that the difference between one or more parameters of the two compared objects are not significantly different.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Spit: As used in this disclosure, a spit refers to a composite prism structure formed by the combination of a prism and a pyramid such that the apex of the pyramid forms a point capable of pushing through the surface of a second structure.

Stake: As used in this disclosure, a stake is a stanchion that is driven into a horizontal surface, such as the ground, to serve as an anchor point. The stake is usually formed with a spit.

Stanchion: As used in this disclosure, a stanchion refers to a vertically oriented prism-shaped pole, post, or support.

Stop: As used in this disclosure, a stop is a mechanical structure that blocks the motion of an object along a track. The stop is used to limit the range of motion of the object.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Tight Fit: As used in this disclosure, a tight fit refers to the insertion of a first object into a second object such that there is not a lot of space between the first object and the second object. By not a lot of space is meant that friction occurs when the first object moves within the second object.

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A system for deterring predation of domesticated animals comprising an elevating structure, a disk structure, and a plurality of monofilament cords;

wherein the elevating structure elevates the disk structure above the ground;

wherein the plurality of monofilament cords are suspended above the ground by the disk structure;

wherein the plurality of monofilament cords forms a barrier structure that encloses a protected space;

wherein the elevating structure forms a stanchion structure that is anchored into the ground;

wherein the elevating structure transfers the load of the disk structure to the ground;

wherein the plurality of monofilament cords attach to the disk structure;

wherein the disk structure elevates the plurality of monofilament cords above the ground;

wherein the disk structure comprises a plate structure, a plurality of anchor bars, and a fastening cap;

wherein the plurality of anchor bars attach to the plate structure;

wherein the fastening cap attaches to the plate structure.

2. The system for deterring predation of domesticated animals according to claim 1 wherein the elevating structure is a load bearing structure;

wherein the elevating structure is an extension structure;

wherein the disk structure attaches to the elevating structure to form a composite structure;

wherein the center axis of the elevating structure is roughly vertically oriented.

3. The system for deterring predation of domesticated animals according to claim 2 wherein the disk structure is a disk shaped structure;

wherein the disk structure is a rigid structure;

wherein the disk structure is a load bearing structure;

wherein the disk structure forms a superior structure of the system for deterring predation of domesticated animals;

wherein the disk structure attaches to a superior congruent end of the elevating structure to form the composite structure.

4. The system for deterring predation of domesticated animals according to claim 3 wherein each monofilament cord selected from the plurality of monofilament cords is a cord;

wherein each selected monofilament cord has a monofilament constructure;

wherein an initial end of each selected monofilament cord is fixed to the disk structure;

wherein a remaining end of each selected monofilament cord attaches to an anchor structure that is proximal to the ground;

wherein the plurality of monofilament cords form the barrier structure of the protected space formed by the system for deterring predation of domesticated animals;

wherein each monofilament cord selected from the plurality of monofilament cords is laid out such that the plurality of monofilament cords are evenly distributed around the 360 degree arc formed by the disk structure.

5. The system for deterring predation of domesticated animals according to claim 4 wherein the elevating structure comprises a stake substructure and a stanchion substructure;

wherein the stake substructure forms an inferior structure of the elevating structure;

wherein the stanchion substructure forms the superior structure of the elevating structure.

6. The system for deterring predation of domesticated animals according to claim 5 wherein the stake substructure anchors the system for deterring predation of domesticated animals into the ground;

wherein the stake substructure is driven into the ground;

wherein the stake substructure is a portion of the elevating structure that is below the surface of the ground.

7. The system for deterring predation of domesticated animals according to claim 6 wherein the stanchion substructure is a portion of the elevating structure that is above the ground;

wherein the stanchion substructure projects away from the ground in a roughly vertical direction;

wherein the disk structure attaches to a congruent end of the stanchion substructure that is distal from the ground;

wherein the stanchion substructure forms the extension structure that elevates the disk structure above the ground.

8. The system for deterring predation of domesticated animals according to claim 7 wherein the plate structure forms a primary structure of the disk structure;

wherein the plate structure has a disk shape;

wherein the plate structure is a rigid structure;

wherein the plate structure forms a primary shape of the disk structure;

wherein the plate structure attaches to a superior congruent end of the elevating structure;

wherein the plate structure attaches to the elevating structure to form the composite structure.

9. The system for deterring predation of domesticated animals according to claim 8 wherein each anchor bar selected from the plurality of anchor bars permanently attaches to a congruent end of the disk structure of the plate structure;

wherein each selected anchor bar forms an anchor point that the initial end of each monofilament cord selected from the plurality of monofilament cords attaches to;

wherein each selected anchor bar forms a plurality of anchor points for a subplurality of monofilament cords selected from the plurality of monofilament cords.

10. The system for deterring predation of domesticated animals according to claim 9 wherein the fastening cap is a fastening device;

wherein the fastening cap removably attaches the plate structure to the superior congruent end of the elevating structure.

* * * * *